3,234,266
N-HYDROCARBYLOXYIMINOMALONONITRILES
AND PROCESS FOR PREPARING THEM
Elwood P. Blanchard, Jr., Wilmington, Del., assignor to
E. I. du Pont de Nemours and Company, Wilmington,
Del., a corporation of Delaware
No Drawing. Filed Aug. 13, 1963, Ser. No. 301,909
6 Claims. (Cl. 260—465.5)

This invention is concerned with a new class of organic chemical compounds and a process for their preparation. More particularly, it is concerned with substituted iminomalononitriles and closely related compounds.

The compounds of this invention are N-hydrocarbyloxyiminomalononitriles. They are prepared by the reaction of an alkali or alkaline earth metal salt of isonitrosomalononitrile with a hydrocarbyl halide or sulfate. This may be illustrated by the equation:

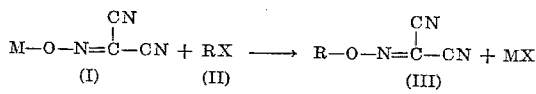

where M is one equivalent of an alkali or alkaline earth metal ion, R is a hydrocarbyl group of 20 carbon atoms or less, and X is a halogen, i.e., F, Cl, Br, or I or a sulfate group, $-OSO_2OR$. Metals preferred for M are the alkali metals, i.e., lithium, sodium, potassium, rubidium, and cesium.

"Hydrocarbyl" is used in its accepted meaning as representing a monovalent radical formed from a hydrocarbon by removal of a hydrogen atom. The hydrocarbyl groups represented by R in Formulas II, III, IV, VI, VII, and IX may be any radical composed solely of carbon and hydrogen and containing 20 or fewer carbon atoms. "Hydrocarbyl" is used in its full generic sense. The wide variation in the hydrocarbyl groups used in the illustrations which follow makes it evident that all such hydrocarbyl groups are operable. Hydrocarbyl groups may vary as to whether they are alkyl, cycloalkyl, aryl, aralkyl, alkaryl, single ring, multi ring, aliphatically saturated, aliphatically unsaturated, straight chain, branched chain, large, small, and the like. The widest variation of this sort does not in any way detract from the fundamental characteristic of the hydrocarbyl radical of passing unchanged through the process of this invention and exercising no effect whatever on the chemical steps of the process. Representative hydrocarbyl groups include alkyl groups such as methyl, ethyl, tert-butyl, hexyl, isooctyl, dodecyl, octadecyl, eicosyl, alkenyl and alkynyl groups such as vinyl, ethynyl, propargyl, 9-octadecenyl, 9-octadecynyl, butadienyl, 9,12-octadecadienyl; cycloalkyl groups such as cyclopropyl, cyclobutyl, cyclopentyl, cyclohexyl, cyclooctyl, camphyl, methylcyclohexyl, 3,5-dicyclohexylcyclohexyl, cyclooctadecyl, cycloeicosyl; aryl groups such as phenyl, naphthyl, anthryl, p-biphenylyl, p,p'-triphenylyl, naphthacenyl, benzanthryl, chrysenyl, 9-phenyl-1-anthryl; alkaryl groups such as p-tolyl, duryl, p-cumenyl, p-vinylphenyl, 2,4,6-tributylphenyl, 4-isopropylnaphthyl, 9,10-diethyl-1-anthryl, 9-hexyl-1-anthryl, 6-methyl-2 - naphthyl; and aralkyl groups such as benzyl, phenethyl, styryl, diphenylmethyl, triphenylmethyl, $\alpha,\beta,\beta$-triphenylethyl, $\alpha$-naphthylethyl, 2-(2-anthryl)ethyl, 4-(2-anthryl)butyl, and the like.

It is obvious that hydrocarbyl groups containing 12 or fewer carbon atoms, particularly those containing 6 or fewer carbon atoms, are least expensive and most available, and to that extent preferred. But there is to be no question of the operability of, or of the intent to include and disclose, any hydrocarbyl group whatsoever containing 20 or fewer carbon atoms. In this connection also, the preferred hydrocarbyl groups are free of acetylenic type carbon-to-carbon unsaturation, and, more preferred yet, are those hydrocarbyl groups entirely free of aliphatic carbon-to-carbon unsaturation, i.e., those which are aliphatically saturated.

Hydrocarbylidene is used to designate a radical otherwise similar to hydrocarbyl as defined above except that it is divalent and both bonds stem from the same carbon atom.

The reaction of an alkali or alkaline earth metal salt of isonitrosomalononitrile with a hydrocarbyl halide or sulfate to obtain an N-hydrocarbyloxyliminomalononitrile may be carried out without the presence of any added materials. Thus, the reaction can be carried out by impact grinding the reactants together in a closed container; however, it is preferred to carry out the reaction in the presence of a liquid reaction medium which is inert to the reactants and products. Suitable liquids include water; alcohols such as methanol, ethanol, butanol, and hexanol; ethers such as dimethyl ether, diethyl ether, and tetrahydrofuran; hydrocarbons such as hexane, petroleum ether, benzene, and toluene, and the like, as well as mixtures of the above named liquids.

Pressure is not a critical factor in this reaction, and pressures in the range from 0.1 to 100 atmospheres and above are operable. Atmospheric pressure is preferred for convenience. The reaction may be carried out at temperatures in the range 0–200° C.

The molar ratio in which the reactants are brought together to carry out this reaction is also not critical. Molar ratios from 1:19 to 19:1 may be employed. Molar ratios of about 1:1 are the most practical.

The N-hydrocarbyloxyiminomalononitriles of the invention react readily with hydrazine to form 2-cyano-2-(hydrocarbyloxyimino)acetamide hydrazones as indicated by the equation:

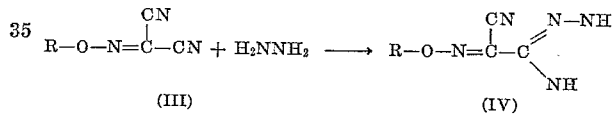

The 2-cyano-2-(hydrocarbyloxyimino)acetamide hydrazones in turn react readily with monocarbonyl compounds such as aldehydes and ketones to yield the corresponding 2-cyano-2 - (hydrocarbyloxyimino)acetamide hydrocarbylidenehydrazones as the principal product and $\alpha$-(hydrocarbyloxyimino)-$\Delta^2$-1,2,4-triazoline-3 - acetonitriles as minor products as shown, respectively, in the following equations:

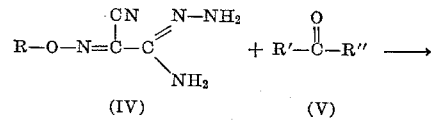

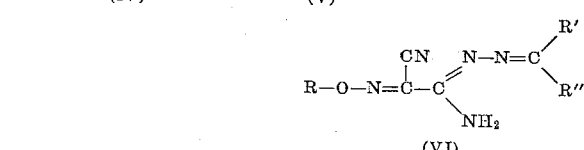

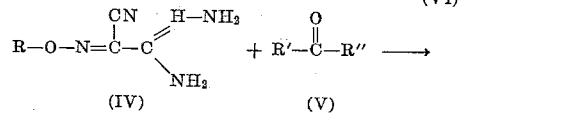

in which R is as defined above, R' is defined the same as R, and R" may be hydrogen or R with the additional proviso that R' and R", taken together, may represent a polymethylene chain of 2–7 members, i.e., —(CH₂)ₙ— where $n$ is from 2–7 inclusive.

The 2-cyano - 2 - (hydrocarbyloxyimino)acetamide hydrazones also react readily with vicinal dicarbonyl compounds such as vicinal diketones and vicinal ketoaldehydes such as methylglyoxal to yield the corresponding α-(hydrocarbyloxyimino)-1,24-triazine-3-acetonitriles as shown in the following equation:

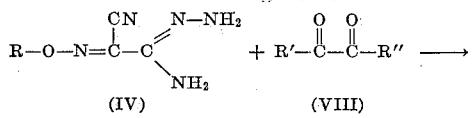

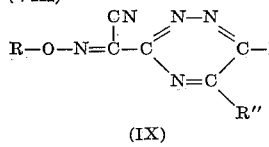

in which R, R', and R" are as defined above.

Cyclic embodiments of compounds of Formulas V and VIII which may be employed in the processes described above include cyclopropanone, cyclohexanone, cyclooctanone, 1,2-cyclobutanedione, 1,2-cyclopentanedione, 1,2-cycloheptanedione, and the like.

In the reaction of compounds of Formula III with hydrazine as well as the reactions of compounds of Formula IV with compounds of Formulas V and VIII, as shown in the equations above, the process conditions, including the effect of a liquid reaction medium, pressure, temperature, and molar ratio ranges, are the same as those defined above with the single exception that in these latter processes it is preferred that the temperature of the reaction be in the range from 0° to 100° C.

In the following examples parts are by weight unless otherwise indicated. Example II represents a preferred embodiment.

*Example I*

To a solution of 1330 parts of potassium isonitrosomalononitrile in a mixture of 10,000 parts of water and 3947 parts of ethanol is added with stirring 1260 parts of methyl sulfate. An exothermic reaction occurs accompanied by the formation of a deep red color. The mixture is allowed to stand for 48 hours, and then the volatile material is distilled at reduced pressure. The distillate is extracted with ether, the ether phase dried over MgSO₄, filtered, and the ether distilled. The two-phase residue is separated and the upper phase eluted from a short column of alumina (Activity I) with 1784 parts of ether. The eluate is concentrated and the residue distilled to give 114 parts of N-methoxyiminomalononitrile.

*Analysis.*—Calcd. for C₄H₃N₃O: C, 44.00; H, 2.75; N, 38.5. Found: C, 44.81; H, 3.13; N, 38.00.

*Example II*

To a stirred solution of 266 parts of potassium isonitrosomalononitrile in 873 parts of ethylene glycol dimethyl ether is added 300 parts of methyl iodide. An exothermic reaction ensues. After one hour the mixture is cooled and passed through a short column of Activity I alumina and eluted with 5600 parts of ether. The eluate is passed through a second column of Activity I alumina and then the eluate is concentrated by distillation. Fractionation of the residue gives 65 parts of N-methoxyiminomalononitrile in the form of a colorless liquid, B.P. 88–90° C. at 105 mm. Hg and $n_D^{25}$, 1.4431. When methyl bromide is substituted for methyl iodide in the procedure of this example, N-methoxyiminomalononitrile is also obtained.

*Example III*

To a solution of 32 parts of anhydrous hydrazine in 789 parts of alcohol is added a solution of 109 parts of N-methoxyiminomalononitrile in 789 parts of alcohol. An immediate exothermic reaction occurs with formation of a yellow crystalline precipate. After 1.5 hours the mixture is cooled to 0° C., filtered, and the crystals dried in a CaCl₂ desiccator to leave 120 parts of 2-cyano-2-(methoxyimino)acetamide hydrazone in the form of pale yellow plates, M.P. 130° C. (dec.).

*Analysis.*—Calcd. for C₄H₇N₅O: C, 34.02; H, 4.95; N, 49.60. Found: C, 34.47, 34.58; H, 5.06, 5.03; N, 49.29, 49.70.

*Example IV*

Two hundred parts of 2-cyano-2-(methoxyimino)-acetamide hydrazone and 344 parts of benzil are dissolved in 2368 parts of ethanol by warming on the steam bath. After standing 15 hours at room temperature, the mixture is cooled to 0° C. and the crystals filtered. The filtrate is concentrated at reduced pressure and the crystalline residue combined with the residue from the filtration. Recrystallization from ethanol gives 346 parts of α-(methoxyimino) - 5,6 - diphenyl-1,2,4-triazine-3-acetonitrile as yellow needles, M.P. 165–167° C.

*Analysis.*—Calcd. for C₁₈H₁₃N₅O: C, 68.55; H, 4.13; N, 22.20. Found: C, 68.13, 68.20; H, 3.91, 4.07; N, 23.07, 23.02.

*Example V*

To a solution of 141 parts of 2-cyano-2-(methoxyimino)acetamide hydrazone in 1600 parts of hot ethanol is added 90 parts of 2,3-butanedione and the solution heated at reflux for five minutes. On cooling, crystals deposit and are collected by filtration. Recrystallization from alcohol gives 70 parts of α-(methoxyimino)-5,6-dimethyl-1,2,4-triazine-3-acetonitrile, M.P. 140–143° C.

*Analysis.*—Calcd. for C₈H₉N₅O: C, 50.3; H, 4.7; N, 36.6. Found: C, 50.8; H, 5.0; N, 37.0.

*Example VI*

To a solution of 15 parts of 2-cyano-2-(methoxyimino) acetamide hydrazone in 237 parts of ethanol is added 21 parts of benzaldehyde. The mixture is warmed to reflux and then allowed to cool to room temperature. After 15 hours, the mixture is cooled to 0° C. and filtered. The residue is recrystallized from ethanol to give 19 parts of 2 - cyano - 2-(methoxyimino)acetamide benzylidenehydrazone as yellow needles, M.P. 155–6° C. (dec.).

*Analysis.*—Calculated for C₁₁H₁₁N₅O: C, 57.7; H, 4.80; N, 30.50. Found: C, 57.17, 57.44; H, 5.15, 4.96; N, 30.06, 30.09.

*Example VII*

A solution of 19 parts of 2-cyano-2-(methoxyimino) acetamide hydrazone in 40 parts of alcohol is treated with 15 parts of acetone and heated on a steam bath. Evaporation of the solvent leaves an oil which is eluted from an alumina column with ethyl acetate and then recrystallized from hexane to give 13 parts of 2-cyano-2-(methoxyimino)acetamide isopropylidenehydrazone, M.P. 70–71° C.

*Analysis.*—Calcd. for C₇H₁₁N₅O: C, 46.4; H, 6.1; N, 38.6. Found: C, 47.2; H, 6.2; N, 39.9.

*Example VIII*

A solution of 107 parts of 2-cyano-2-(methoxyimino) acetamide hydrazone in 1600 parts of 1,2-dimethoxyethane is treated with 100 parts of cyclohexanone and allowed to stand for six hours. The solvent is evaporated and the residual oil eluted from an alumina column with ether. Evaporation of the ether eluate and recrystallization from ether-petroleum ether gives 100 parts of 2-cyano - 2 - (methoxyimino)acetamide cyclohexylidenehydrazone, M.P. 69–71° C.

*Analysis.*—Calculated for C₁₀H₁₅N₅O: C, 54.3; H, 6.8; N, 31.6. Found: C, 54.1; H, 6.8; N, 32.5.

*Example IX*

To a solution of 90 parts of 2-cyano-2-(methoxyimino) acetamide hydrazone in 2000 parts of alcohol is added 15 parts of concentrated hydrochloric acid and 100 parts of acetophenone. The mixture is warmed on the steam bath and then allowed to stand 0.5 hour. Addition of 10,000 parts of water results in the precipitation of yellow crystals. The crystals are collected and recrystallized from aqueous ethanol to give 115 parts of 2-cyano-2-(methoxyimino)acetamide α-methylbenzylidenehydrazone, M.P. 95.5–96.3° C.

*Analysis.*—Calcd. for $C_{12}H_{13}N_5O$: C, 59.3; H, 5.35; N, 28.8. Found: C, 59.8; H, 5.2; N, 29.4.

The lower molecular weight N-hydrocarbyloxyiminomalononitrile (i.e., where the hydrocarbyl groups contain 1–8 carbon atoms) are colorless liquids and, as illustrated in Example X, are useful as solvents for preparing films of polymeric materials such as polyvinyl acetate.

Example X

Five parts of granular high viscosity polyvinyl acetate is stirred at room temperature into about 100 parts of N-methoxyiminomalononitrile to obtain a clear, viscous solution. This solution is spread on a glass plate and the N-methoxyiminomalononitrile is allowed to evaporate. The resulting film of polyvinyl acetate is stripped from the plate and found to be clear, tough and flexible.

The higher molecular weight N-hydrocarbyloxyiminomalononitrile (i.e., where the hydrocarbyl groups contain 8–20 carbon atoms) are viscous liquids, greases and waxy solids. These compounds are sufficiently non-volatile at atmospheric pressure to be useful as non-migrating plasticizers for polyvinyl acetate, polyvinyl chloride and similar vinyl polymers.

The 2-cyano-2-(hydrocarbyloxyimino)acetamide hydrazones of Formula IV, the 2-cyano-2-(hydrocarbyloxyimino)acetamide hydrocarbylidenehydrazones of Formula VI, and the α-(hydrocarbyloxyimino)-1,2,4-triazine-3-acetonitriles of Formula IX are all colored compounds and all useful as dyes for fabrics. This is illustrated in Examples XI and XII.

Example XI

To a boiling solution of 2 parts of 2-cyano-2-(methoxyimino)acetamide benzylidenehydrazone and 2 parts of a sulfonated lignin dispersant in 20,000 parts of water are added swatches of fabrics of polyacrylonitrile, 66 nylon, silk and wool. Boiling is continued for one hour. The swatches are removed from the dye bath, rinsed with water, washed with soap and water and again rinsed with water. The dried fabrics are all dyed a golden tan.

Example XII

To a solution of two parts of α-(methoxyimino)-5,6-diphenyl-1,2,4-triazine-3-acetonitrile and two parts of a sulfonated lignin dispersant in 20,000 parts of water heated at about 100° C. are added swatches of fabrics of 66 nylon, silk, and wool. Heating and stirring are continued for one hour. The swatches are then removed from the dye bath, rinsed with water, washed with soap and water, and again rinsed with water. The dried fabrics are all dyed tan in color.

When the halides (A) indicated in Table I are substituted for methyl iodide in the procedure of Example II, the indicated N-hydrocarbyloxyiminomalononitriles (B) are obtained. These products are treated with hydrazine according to the procedure of Example III to obtain the indicated 2-cyano-2-(hydrocarbyloxyimino)acetamide hydrazones (C). These hydrazones react with the indicated monocarbonyl compounds (D) according to the procedure of Example VI to yield the indicated 2-cyano-2-(hydrocarbyloxyimino)acetamide hydrocarbylidenehydrazones (E) and with the indicated vicinal dicarbonyl compounds (F) according to the procedure of Example V to yield the indicated α-(hydrocarbyloxyimino)-1,2,4-triazine-3-acetonitrile (G).

TABLE I

| Item | A. Halide | B. N-Hydrocarbyloxyiminomalononitrile | C. 2-Cyano-2-(hydrocarbyloxyimino)acetamide hydrazone | D. Monocarbonyl Compound |
|---|---|---|---|---|
| 1 | Ethyl bromide | N-ethoxyiminomalononitrile | 2-cyano-2-(ethoxyamino)acetamide hydrazone. | Stearophenone. |
| 2 | t-Butyl chloride | N-t-butoxyiminomalononitrile | 2-cyano-2-(t-butoxyimino)acetamide hydrazone. | Methyl vinyl ketone. |
| 3 | n-Octyl bromide | N-octyloxyiminomalononitrile | 2-cyano-2-(octyloxyimino)acetamide hydrazone. | Di-n-octyl ketone. |
| 4 | n-Dodecyl bromide | N-dodecyloxyiminomalononitrile. | 2-cyano-2-(dodecyloxyimino)acetamide hydrazone. | Methylethynyl ketone. |
| 5 | n-Octadecyl iodide | N-octadecyloxyiminomalononitrile. | 2-cyano-2-(octadecyloxyimino)acetamide hydrazone. | Stearone. |
| 6 | n-Eicosyl bromide | N-eicosyloxyiminomalononitrile. | 2-cyano-2-(eicosyloxyimino)acetamide hydrazone. | Methyl cyclohexyl ketone. |
| 7 | Cyclopropyl chloride | N-cyclopropyloxyiminomalononitrile. | 2-cyano-2-(cyclopropyloxyimino)acetamide hydrazone. | Di-n-butyl ketone. |
| 8 | Cyclopropylmethyl bromide | N-cyclopropylmethoxyiminomalononitrile. | 2-cyano-2-(cyclopropylmethoxyimino)acetamide hydrazone. | Ethyl t-butyl ketone. |
| 9 | Cyclobutyl bromide | N-cyclobutoxyiminomalononitrile. | 2-cyano-2-(cyclobutoxyimino)acetamide hydrazone. | Propargyl aldehyde. |
| 10 | Cyclopentyl iodide | N-cyclopentyloxyiminomalononitrile. | 2-cyano-2-(cyclopentyloxyimino)acetamide hydrazone. | 3,4-benzpyrene-5-aldehyde. |
| 11 | Cyclohexyl fluoride | N-cyclohexyloxyiminomalononitrile. | 2-cyano-2-(cyclohexyloxyimino)acetamide hydrazone. | 9-anthraldehyde. |
| 12 | Cyclooctyl bromide | N-cyclooctyloxyiminomalononitrile. | 2-cyano-2-(cyclooctyloxyimino)acetamide hydrazone. | β-Naphthaldehyde. |
| 13 | Vinyl fluoride | N-vinyloxyiminomalononitrile | 2-cyano-2-(vinyloxyimino)acetamide hydrazone. | Octadecanal. |
| 14 | Iodobenzene | N-phenoxyiminomalononitrile | 2-cyano-2-(phenoxyimino)acetamide hydrazone. | Dodecanal. |
| 15 | Allyl iodide | N-allyloxyiminomalononitrile | 2-cyano-2-(allyloxyimino)acetamide hydrazone. | n-Octylaldehyde. |
| 16 | p-Bromobiphenyl | N-p-biphenylyloxyiminomalononitrile. | 2-cyano-2-(p-biphenylyloxyimino)acetamide. | Butyraldehyde. |
| 17 | 2-chloro-1,3-butadiene | N-(1,3-butadiene-2-yl)oxyiminomalononitrile. | 2-cyano-2-(1,3-butadiene-2-yl-oxyimino)acetamide hydrazone. | Acetaldehyde. |
| 18 | α-Chloronaphthalene | N-α-naphthyloxyiminomalononitrile. | 2-cyano-2-(α-naphthyloxyimino)acetamide hydrazone. | Acetone. |
| 19 | 1-chlorocyclohexene | N-1-cyclohexenyloxyiminomalononitrile. | 2-cyano-2-(1-cyclohexenyloxyimino)acetamide hydrazone. | Methyl ethyl ketone. |
| 20 | 1-iodophenanthrene | N-phenanthryloxyiminomalononitrile. | 2-cyano-2-(phenanthryloxyimino)acetamide hydrazone. | Propionaldehyde. |
| 21 | β-Chlorostyrene | N-styryloxyiminomalononitrile | 2-cyano-2-(styryloxyimino)acetamide hydrazone. | Isobutyraldehyde. |
| 22 | 4-phenylbutyl chloride | N-4-phenylbutoxyiminomalononitrile. | 2-cyano-2-(4-phenylbutoxyimino)acetamide hydrazone. | Butyrophenone. |
| 23 | Triphenylvinyl bromide | N-triphenylvinyloxyiminomalononitrile. | 2-cyano-2-(triphenylvinyloxyimino)acetamide hydrazone. | Dipropyl ketone. |
| 24 | 9-bromoanthracene | N-9-anthryloxyiminomalononitrile. | 2-cyano-2-(9-anthryloxyimino)acetamide hydrazone. | Acetone. |
| 25 | 1-chloro-1-octyne | N-1-octynyloxyiminomalononitrile. | 2-cyano-2-(1-octynyloxyimino)acetamide hydrazone. | Butyraldehyde. |
| 26 | Benzyl fluoride | N-benzyloxyiminomalononitrile. | 2-cyano-2-(benzyloxyimino)acetamide hydrazone. | Benzaldehyde. |
| 27 | Triphenylchloromethane | N-triphenylmethoxyiminomalononitrile. | 2-cyano-2-(triphenylmethoxyimino)acetamide hydrazone. | Acetone. |

TABLE I—Continued

| Item | E. 2-Cyano-2-(hydrocarbyloxyimino)acetamide Hydrocarbylidenehydrazone | F. Vicinal Dicarbonyl Compound | G. α-(Hydrocarbyloxyimino)-1,2,4-triazine-3-acetonitrile |
|---|---|---|---|
| 1 | 2-cyano-2-(ethoxyimino)acetamide α-heptadecylbenzylidenehydrazone. | 4-methylbenzil | α-ethoxyimino-5(6)-phenyl-6(5)-p-tolyl-1,2,4-triazine-3-acetonitrile. |
| 2 | 2-cyano-2-(t-butoxyimino)acetamide α-vinylethylidenehydrazone. | p-Tolil | α-(t-butoxyimino)-5,6-di-p-tolyl-1,2,4-triazine-3-acetonitrile. |
| 3 | 2-cyano-2-(octyloxyimino)acetamide α-octylnonylidenehydrazone. | 1-phenyl-1,2-butanedione | α-octyloxyimino-5(6)-ethyl-6(5)-phenyl-1,2,4-triazine-3-acetonitrile. |
| 4 | 2-cyano-2-(dodecyloxyimino)acetamide α-ethynylethylidenehydrazone. | Acetylbenzoyl | α-dodecyloxyimino-5(6)-methyl-6(5)-phenyl-1,2,4-triazine-3-acetonitrile. |
| 5 | 2-cyano-2-(octadecyloxyimino)acetamide α-heptadecyloctadecylidenehydrazone. | 1,2-cycloheptanedione | α-octadecyloxyimino-5,6-pentamethylene-1,2,4-triazine-3-acetonitrile. |
| 6 | 2-cyano-2-(eicosyloxyimino)acetamide α-cyclohexylethylidenehydrazone. | ____do____ | α-eicosyloxyimino-5,6-trimethylene-1,2,4-triazine-3-acetonitrile. |
| 7 | 2-cyano-2-(cyclopropyloxyimino)acetamide α-butylpentylidenehydrazone. | Diisobutyryl | α-cyclopropyloxyimino-5,6-diisopropyl-1,2,4-triazine-3-acetonitrile. |
| 8 | 2-cyano-2-(cyclopropylmethoxyimino)acetamide α-t-butylpropylidenehydrazone. | 1,2-cyclohexanidione | α-cyclopropylmethoxyimino-5,6-tetramethylene-1,2,4-triazine-3-acetonitrile. |
| 9 | 2-cyano-2-(cyclobutoxyimino)acetamide propargylidenehydrazone. | Dipivaloyl | α-cyclobutoxyimino-5,6-(t-butyl)-1,2,4-triazine-3-acetonitrile. |
| 10 | 2-cyano-2-(cyclopentyloxyimino)acetamide (3,4-benzpyrene-5-yl)methylidenehydrazone. | Dipropionyl | α-cyclopentyloxyimino-5,6-diethyl-1,2,4-triazine-3-acetonitrile. |
| 11 | 2-cyano-2-(cyclohexyloxyimino)acetamide 9-anthrylmethylidenehydrazone. | Benzil | α-cyclohexyloxyimino-5,6-diphenyl-1,2,4-triazine-3-acetonitrile. |
| 12 | 2-cyano-2-(cyclooctyloxyimino)acetamide β-naphthylmethylidenehydrazone. | ____do____ | α-cyclooctyloxyimino-5,6-diphenyl-1,2,4-triazine-3-acetonitrile. |
| 13 | 2-cyano-2-(vinyloxyimino)-acetamide octadecylidenehydrazone. | Diacetyl | α-vinyloxyimino-5,6-dimethyl-1,2,4-triazine-3-acetonitrile. |
| 14 | 2-cyano-2-(phenoxyimino)acetamide dodecylidenehydrazone. | ____do____ | α-phenoxyimino-5,6-dimethyl-1,2,4-triazine-3-acetonitrile. |
| 15 | 2-cyano-2-(allyloxyimino)acetamide octylidenehydrazone. | ____do____ | α-allyloxyimino-5,6-dimethyl-1,2,4-triazine-3-acetonitrile. |
| 16 | 2-cyano-2-(p-biphenylyloxyimino)acetamide butylidenehydrazone. | Benzil | α-(p-biphenylyloxyimino)-5,6-diphenyl-1,2,4-triazine-3-acetonitrile. |
| 17 | 2-cyano-2-(1,3-butadiene-2-yloxyimino) acetamide ethylidenehydrazone. | ____do____ | α-(1,3-butadien-2-yloxyimino)-5,6-diphenyl-1,2,4-triazine-3-acetonitrile. |
| 18 | 2-cyano-2-(α-naphthyloxyimino) acetamide isopropylidenehydrazone. | Diacetyl | α-(α-naphthyloxyimino)-5,6-dimethyl-1,2,4-triazine-3-acetonitrile. |
| 19 | 2-cyano-2-(1-cyclohexenyloxyimino)acetamide α-ethylethylidenehydrazone. | ____do____ | α-(1-cyclohexenyloxyimino)-5,6-dimethyl-1,2,4-triazine-3-acetonitrile. |
| 20 | 2-cyano-2-(phenanthryloxyimino)acetamide propylidenehydrazone. | Benzil | α-phenanthryloxyimino-5,6-diphenyl-1,2,4-triazine-3-acetonitrile. |
| 21 | 2-cyano-2-(styryloxyimino)acetamide β,β,-dimethylethylidenehydrazone. | ____do____ | α-styryloxyimino-5,6-diphenyl-1,2,4-triazine-3-acetonitrile. |
| 22 | 2-cyano-2-(4-phenylbutoxyimino)acetamide α-phenylbutylidenehydrazone. | Diacetyl | α-(4-phenylbutoxyimino)-5,6-dimethyl-1,2,4-triazine-3-acetonitrile. |
| 23 | 2-cyano-2-(triphenylvinyloxyimino) acetamide α-propylbutylidenehydrazone. | 1,2-cyclohexanedione | α-triphenylvinyloxyimino-5,6-tetramethylene-1,2,4-triazine-3-acetonitrile. |
| 24 | 2-cyano-2-(9-anthryloxyimino) acetamide isopropylidenehydrazone. | Benzil | α-(9-anthryloxyimino)-5,6-diphenyl-1,2,4-triazine-3-acetonitrile. |
| 25 | 2-cyano-2-(1-octynyloxyimino)acetamide butylidenehydrazone. | Diacetyl | α-(1-octynyloxyimino)-5,6-dimethyl-1,2,4-triazine-3-acetonitrile. |
| 26 | 2-cyano-2-(benzyloxyimino)acetamide benzylidenehydrazone. | Benzil | α-benzyloxyimino-5,6-diphenyl-1,2,4-triazine-3-acetonitrile. |
| 27 | 2-cyano-2-(triphenylmethoxyimino)acetamide isopropylidenehydrazone. | Diacetyl | α-triphenylmethoxyimino-5,6-dimethyl-1,2,4-triazine-3-acetonitrile. |

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

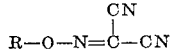

wherein R is a hydrocarbyl group of 1 to 20 carbon atoms.

2. A compound of the formula

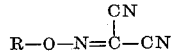

where R is an alkyl group of 1 to 12 carbon atoms.

3. A compound of the formula

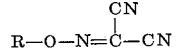

where R is an alkyl group of 1 to 6 carbon atoms.

4. N-methoxyiminomalononitrile.

5. Process for preparing an N-hydrocarbyloxyiminomalononitrile having the formula

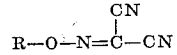

wherein R is a hydrocarbyl group of 1 to 20 carbon atoms, which comprises (I) contacting and reacting, at a temperature in the range 0° C. to 200° C. and a pressure in the range 0.1 atm. to 100 atm., a metal salt of isonitrosomalononitrile wherein said metal is selected from the class consisting of alkali metals and alkaline earth metals with a compound RX wherein R is defined as above and X is selected from the group consisting of halogen and sulfate —OSO₂OR wherein R is defined as above, with the molar ratio of said metal salt to RX being in the range 1:19 to 19:1, and (II) recovering said N-hydrocarbyloxyiminomalononitrile.

6. The process of claim 5 wherein R is alkyl of 1 to 12 carbon atoms which comprises (I) contacting and reacting, in the presence of a liquid reaction medium inert to the reactants and reaction products, an alkali metal salt of isonitrosomalononitrile with an alkyl halide of 1 to 12 carbon atoms, with the molar ratio of said metal salt to alkyl halide being about 1:1, and (II) recovering said N-hydrocarbyloxyiminomalononitrile.

References Cited by the Examiner

UNITED STATES PATENTS 1,733,462  10/1929  Kropp _____ 260—566
2,832,804  4/1958  Richter et al. _____ 260—566 X CHARLES B. PARKER, *Primary Examiner.*